3,050,524
DIHYDRODIBENZOTHIAZEPINES
Harry Louis Yale, New Brunswick, and Francis A. Sowinski, Edison, N.J., assignors to Olin Mathieson Chemical Corporation, New York, N.Y., a corporation of Virginia
No Drawing. Filed Feb. 10, 1961, Ser. No. 88,290
12 Claims. (Cl. 260—293.4)

This invention relates to new basically substituted dihydrodibenzothiazepines (and their salts) having valuable therapeutic properties, processes for the preparation thereof, and new intermediates useful in such processes.

The therapeutically active compounds of this invention includes dihydrodibenzothiazepines of the general Formula I:

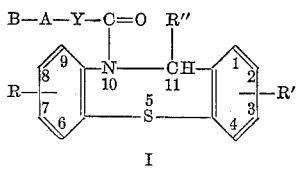

I wherein A is a lower alkylene or an oxy interrupted lower alkylene radical, B is a basic saturated nitrogen-containing radical of less than twelve carbon atoms, Y is oxy (—O—) or imino (—NH—), R and R' are the same or different and represent hydrogen, halogen, lower alkyl, lower alkoxy or trifluoromethyl, and R" is hydrogen, lower alkyl, or monocyclic aryl; and salts thereof. Among the suitable radicals represented by the symbol B are: amino; (lower alkyl)amino; di(lower alkyl)amino; (hydroxy-lower alkyl)amino; di(hydroxy-lower alkyl)amino; and basic saturated 5 to 6 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2,3, or 4-(lower alkyl) piperidino or 2, 3, or 4-(N-lower alkyl) piperidyl]; di(lower alkyl) piperidyl [e.g., 2,4-, 2,5-, or 3,5-di(lower alkyl)piperidino, or 2, 3, or 4-(N-lower alkyl-2, 3, or 4-(lower alkyl)piperidyl]; (lower alkoxy)piperidyl]; pyrrolidyl; (lower alkyl)pyrrolidyl; di(lower alkyl)pyrrolidyl; (lower alkoxy)pyrrolidyl]; morpholinyl [i.e., morpholino, 2-morpholinyl and 3-morpholinyl]; (lower alkyl)-morpholinyl; di(lower alkyl)morpholinyl; (lower alkoxy)-morpholinyl; thiamorpholinyl; (lower alkyl)thiamorpholinyl; di(lower alkyl)thiamorpholinyl; (lower alkoxy)thiamorpholinyl; piperazyl; (lower alkyl)piperazyl (e.g., N⁴-methylpiperazino); di(lower alkyl)piperazyl; (lower alkoxy) piperazyl; (hydroxy-lower alkyl)piperazyl [e.g., N⁴-(2-hydroxyethyl)piperazino]; (lower alkanoyloxyalkyl)piperazyl [e.g., N⁴-(2-acetoxyethyl)piperazino]; (hydroxy-lower alkoxy-lower alkyl)piperazyl [e.g., N⁴-(2-hydroxyethoxyethyl)piperazino]; and (carbo-lower alkoxy)piperazyl [e.g., N⁴-2-carbomethoxy, carboethoxy, or carbopropoxy)piperazino]. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (i.e., ethylene, trimethylene-1,3, and propylene-1,2); B represents a di(lower alkyl)amino radical, an N⁴-(lower alkyl)piperazino radical or an N⁴-(2-hydroxyethyl)piperazino radical, R is in the 8-position and represents hydrogen, chloro or trifluoromethyl, and R' and R" are hydrogen.

As to the salts of the dihydrodibenzothiazepines, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable as ataractic agents and thus may be used in the treatment of depressed psychotic states and as antihistamines. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by a series of reactions as shown by the following equations, wherein R, R', R", A and B are as hereinbefore defined:

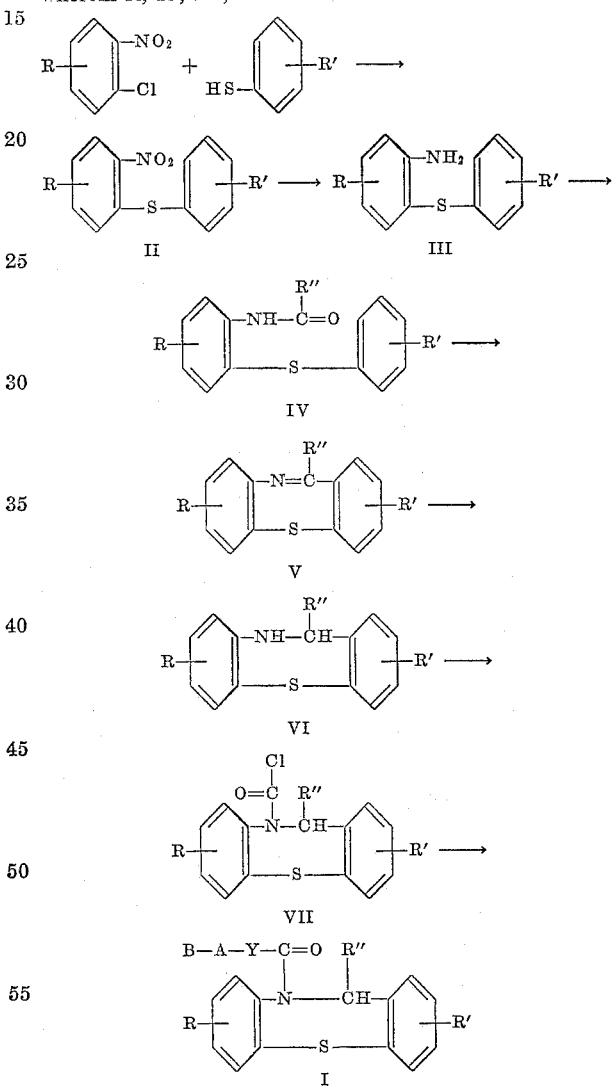

Among the suitable o-chloronitrobenzenes utilizable as initial reagents in these reactions may be mentioned: o-chloronitrobenzene; halo-o-chloronitrobenzenes, such as 2,5-dichloronitrobenzene, 2,4-dichloronitrobenzene, 2-chloro-5-fluoronitrobenzene, and 2-chloro-4-fluoronitrobenzene; (lower alkyl)-o-chloronitrobenzenes, such as 5-(lower alkyl)-2-chloronitrobenzenes (e.g., 5-methyl-2-chloronitrobenzene, 5-ethyl-2-chloronitrobenzene, 5-n-propyl-2-chloronitrobenzene and 5-n-hexyl-2-chloronitrobenzene) and 4-(lower alkyl)-2-chloronitrobenzenes; (lower alkoxy)-o-chloronitrobenzenes, such as 5-(lower alkoxy)-2-chloronitrobenzenes (e.g., 5-methoxy-2-chloronitrobenzene, 5-ethoxy-2-chloronitrobenzene, 5-n-propoxy- 2-chloronitrobenzene and 5-n-hexloxy-2-chloronitrobenzene); and trifluoromethyl-o-chloronitrobenzenes, such as 5-trifluoromethyl-2-chloronitrobenzene and 4-trifluoromethyl-2-chloronitrobenzene.

Among the suitable benzenethiols utilizable as initial reagents in these reactions may be mentioned: benzenethiol; halobenzenethiols, such as 2-chlorobenzenethiol, 4-chlorobenzenethiol, 2-fluorobenzenethiol, 4-fluorobenzenethiol, and 2-bromobenzenethiol; (lower alkyl)benzenethiols, such as o-toulenethiol, p-toulenethiol, 2-ethylbenzenethiol, 4-n-propylbenzenethiol and 4-n-hexylbenzenethiol; (lower alkoxy)benzenethiols, such as 2-methoxybenezenethiol, 4-methoxybenzenethiol, 4-ethoxybenzenethiol and 4-propoxybenzenethiol; and trifluoromethylbenzenethiols, such as 2-trifluoromethylbenzenethiol and 4-trifluoromethylbenzenethiol.

In the initial reaction of the process of this invention, the o-chloronitrobenzene is reacted with the benezenethiol, the reaction preferably being conducted in the presence of a condensation agent such as (e.g., sodium hydroxide), whereby a corresponding 2-nitrophenyl phenyl sulfide (Compounds II) is formed. The nitro group is then reduced to an amine by treatment with a reducing agent such as nascient hydrogen, which may be formed in situ by the action of an electropositive metal on an acid, thereby forming the corresponding 2-(phenylthio)-aniline derivative (Compounds III).

If a final compound is desired which is unsubstituted in the 11-position, the 2-(phenylthio)aniline is then treated with formic acid whereby the corresponding 2-(phenylthio)formanilide (Compounds IV, wherein R" is hydrogen) is produced. If, however, an 11-substituted product is desired, the 2-(phenylthio)-aniline is reacted with a lower alkanoyl halide or an aryl-carbonyl halide, whereby the corresponding acylated aniline derivative (Compound IV, wherein R" is alkyl or aryl) is formed. Among the suitable acyl halides utilizable in this step of the process may be mentioned lower alkanoyl chloride of at least two carbon atoms, as exemplified by acetyl chloride, propionyl chloride, butyryl chloride and hexanoyl chloride, and monocyclic aryl carbonyl chlorides, such as benzoyl chloride, o, m and p-toluyl chloride, and o,p-dimethylbenzoyl chloride.

Compounds IV are then cyclized by treatment with a mixture of polyphosphoric acid and phosphorus oxychloride at an elevated temperature (preferably about 100° C. to about 140° C.) to yield the corresponding dibenzo [b,f] [1,4]thiazepine derivatives (Compounds V). Compounds V are then reduced, as by treatment with a mixture of lithium aluminum hydride and aluminum chloride, to yield the corresponding 10,11-dihydrodibenzo [b,f] [1,4]thiazepine derivatives (Compounds VI).

Compounds VI are then treated with phosgene to yield the corresponding 10-carbonyl chloride derivatives (Compounds VII), which are new intermediates of this invention.

Compounds VII are then reacted with a compound of the formula: B—A—YH, wherein A, B and Y are as hereinbefore defined, to yield the final products of this invention. The reaction is preferably carried out at an elevated temperature. To prepare the acid-addition salts, the resulting base is treated with the desired acid in the usual manner.

The following examples illustrate the invention (all temperatures being in centigrade). The first eight examples are directed to the preparation of the 10-unsubstituted intermediates and the remaining examples are directed to the preparation of the final compounds of this invention.

EXAMPLE 1

*8-Chloro-10,11-Dihydrodibenzo [b,f] [1,4] Thiazepine*

(a) *Preparation of 4-chloro-2-nitrophenyl phenyl sulfide.*—To 211 g. of 2,5-dichloronitrobenzene and 110.2 g. of benzenethiol in 500 ml. 95% ethanol is added a solution of 44 g. of sodium hydroxide in 100 ml. of water, the mixture is refluxed for two and one-half hours, cooled and the solid filtered to give 280.4 g. of product, M.P. about 81–82°. After three crystallizations from 95% ethanol, an analytical sample melting at about 83–84° is obtained.

*Analysis.*—Calcd. for $C_{12}H_8ClNO_2S$: S, 12.06. Found: S, 12.04.

(b) *Preparation of 5-chloro-2-(phenylthio)aniline.*—To 265.7 g. of 4-chloro-2-nitrophenyl phenyl sulfide, 558 g. of iron powder and 2 l. of 95% ethanol is added 25 ml. of concentrated hydrochloric acid, dropwise. Subsequently, the mixture is heated to 55° and the spontaneous exothermic reaction which occurs is controlled by cooling. When the spontaneous reaction has subsided, the mixture is refluxed for three hours, filtered, and the filtrate concentrated to give about 227 g. of the crude product, M.P. about 62–63°. For analysis, a small sample in anhydrous ether is treated with dry hydrogen chloride to give the hydrochloride of 5-chloro-2-(phenylthio)aniline, M.P. about 164–166°.

*Analysis.*—Calcd. for $C_{12}H_{10}ClNS \cdot HCl$: S, 11.78. Found: S, 12.25.

(c) *Preparation of 5-chloro-2-(phenylthio)formanilide.*—221.7 g. of 5-chloro-2-(phenylthio)aniline is added to a mixture of 460 g. of 98% formic acid and 102.1 g. of acetic anhydride. The mixture is refluxed for one hour, concentrated in vacuo and the residue poured on ice to give about 244 g. of product M.P. about 47–49°. An analytical sample is obtained from a mixture of benzene and ligroin, M.P. about 55–56°.

*Analysis.*—Calcd. for $C_{13}H_{10}ClNOS$: S, 12.16. Found: S, 12.28.

(d) *Preparation of 8-chlorodibenzo [b,f] [1,4] thiazepine.*—A well blended mixture of 50.0 g. of 5-chloro-2-(phenylthio) formanilide, 400 g. of polyphosphoric acid and 58.3 g. phosphorous oxychloride is heated for one and one-half hours under nitrogen by means of an ore bath maintained at 120–125°. Much foaming occurs and must be controlled. The cooled mixture is treated with crushed ice, made strongly alkaline with concentrated ammonia and extracted with ether. The ether extracts are dried and concentrated to give about 53.7 g. of crude product, M.P. about 57–60°. Three recrystallizations from hexane yields a constant melting analytical sample, M.P. about 78–79°.

*Analysis.*—Calcd. for $C_{13}H_9ClNS$: N, 5.70; S, 13.04. Found: N, 5.83; S, 13.19.

(e) *Preparation of 8-chloro-10,11-dihydrodibenzo [b,f] [1,4] thiazepine.*—12.3 g. of 8-chlorodibenzo [b,f] [1,4] thiazepine in 100 ml. of dry ether is added dropwise to 3.9 g. of lithium aluminum hydride and 13.3 g. of aluminum chloride in 100 ml. of dry ether. The conventional working up gives about 12.6 g. of crude product, M.P. about 122–123°. An analytical sample from 95% ethanol melts at about 126–127°.

*Analysis.*—Calcd. for $C_{13}H_{10}ClNS$: N, 5.65; S, 12.94. Found: N, 5.51; S, 12.79.

EXAMPLE 2

*10,11-Dihydro-8-(Trifluoromethyl)Dibenzo [b,f] [1,4] Thiazepine*

(a) *Preparation of phenyl-α,α,α-trifluoro-2-nitro-p-tolyl sulfide.*—To 60.5 g. of benzenethiol, 123.9 g. of 4-chloro-3-nitrobenzotrifluoride and 500 ml. of 95% ethanol is added 20 g. of sodium hydroxide in 50 ml. of water. The reaction mixture is then refluxed for two hours and worked up to give the crude product, M.P. about 69–70°. An analytical sample from absolute ethanol melts at about 70–71°.

*Analysis.*—Calcd. for $C_{13}H_8F_3NO_2S$: S, 10.71. Found: S, 10.52.

(b) *Preparation of α,α,α-trifluoro-6-(phenylthio)-m-*

*toluidine, hydrochloride.*—To a stirred solution of 29.9 g. of phenyl-α,α,α-trifluoro-2-nitro-p-tolyl sulfide in 200 ml. of 90% ethanol is added 55.8 g. of iron powder and 5 ml. of concentrated hydrochloric acid. After the spontaneous reaction which occurs has subsided, the mixture is heated to reflux for two hours and filtered while hot. The filtrate is then cooled and concentrated hydrochloric acid is added until no further precipitation occurs. The yield of air-dried product is about 20.7 g., M.P. about 170–177°.

*Analysis.*—Calcd. for $C_{13}H_{10}FNS \cdot HCl$: S, 10.49. Found: S, 10.66.

(c) *Preparation of α,α,α-trifluoro-6-(phenylthio)-m-formotoluidide.*—A mixture of 87.7 of α,α,α-trifluoro-6-(phenylthio)-m-toluidine hydrochloride, 36.8 g. of acetic anhydride and 226 g. of 98% formic acid is refluxed for 0.5 hour and concentrated to dryness in vacuo. The syrupy residue crystallizes on trituration in ligroin to yield about 96.5 g. of product, which after recrystallization from ligroin is constant melting at about 65–66°.

*Analysis.*—Calcd. for $C_{14}H_{10}F_3NOS$: S, 10.79. Found: S, 10.73.

(d) *Preparation of 8-(trifluoromethyl)-dibenzo [b,f] [1,4] thiazepine.*—A stirred mixture of 540 g. of polyphoric acid, 69.6 g. of phosphorus oxychloride and 67.5 g. of α,α,α-trifluoro-6-(phenylthio)-m-formotoluidide is heated under nitrogen in an oil bath maintained at 125–130° for 1.5 hours. The mixture is then poured into 2 kg. of finely crushed ice and then made alkaline with concentrated aqueous ammonia and extracted with ether. The extract is subsequently dried, the ether distilled and the residue extracted with ligroin to give, after cooling, about 37.3 g. of product, M.P. about 77–79°. Two additional recrystallizations from ligroin gives pure material of M.P. about 83–84°.

*Analysis.*—Calcd. for $C_{14}H_8F_3NS$: N, 5.01; S, 11.48. Found: N, 5.08; S, 11.35.

(e) *Preparation of 10,11-dihydro-8-(trifluoromethyl)-dibenzo [b,f] [1,4] thiazepine.*—A solution prepared by portionwise addition of 16.0 g. of anhydrous aluminum chloride to 500 ml. of cooled anhydrous ether is gradually added to a stirred suspension of 4.6 g. of lithium aluminum hydride in 500 ml. of ether, over which an atmosphere of dry nitrogen is maintained. To the mixture is added dropwise a solution of 25.2 g. of 8-(trifluoromethyl)-dibenzo [b,f] [1,4] thiazepine in 750 ml. of anhydrous ether. The mixture is stirred for two hours, after which there is added dropwise 20 ml. of water (with external ice cooling) followed by 20 ml. of 20% sodium hydroxide. The reaction mixture is then filtered, dried and the ether removed by distillation to give about 22.4 g. of product, M.P. about 99–100°.

*Analysis.*—Calcd. for $C_{14}H_{10}F_3NS$: N, 4.98; S, 11.40. Found: N, 4.89; S, 11.71.

EXAMPLE 3

*10,11-Dihydro-Dibenzo [b,f] [1,4] Thiazepine*

(a) *Preparation of 2-nitrodiphenyl sulfide.*—Following the procedure of Example 1, step (a), but substituting 157.6 g. of o-chloronitrobenzene for the 2,5-dichloronitrobenzene there is obtained about 240 g. of product, M.P. about 77–78°.

(b) *Preparation of o-(phenylthio)aniline.*—Following the procedure of Example 1, step (b), but substituting 240 g. of 2-nitrodiphenyl sulfide for the 4-chloro-2-nitrophenyl phenyl sulfide there is obtained o-(phenylthio) aniline as an oil.

(c) *Preparation of 2-(phenylthio)formanilide.*—Following the procedure of Example 1, step (c), but substituting 220 g. of 2-(phenylthio)aniline for the 5-chloro-2-(phenylthio)aniline, 2-(phenylthio)formanilide is obtained.

(d) *Preparation of dibenzo [b,f] [1,4] thiazepine.*—Following the procedure of Example 1, step (d), but substituting 44 g. of 2-(phenylthio)formanilide for the 5-chloro-2-(phenylthio)formanilide, dizenzo [b,f] [1,4] thiazepine is obtained.

(e) *Preparation of 10,11-dihydro-dibenzo [b,f] [1,4] thiazepine.*—Following the procedure of Example 1, step (e), but substituting 2.2 g. of dibenzo [b,f] [1,4] thiazepine for the 8-chlorodibenzo [b,f] [1,4] thiazepine, 10,11-dihydro-dibenzo [b,f] [1,4] thiazepine is obtained.

EXAMPLE 4

*2,8-Dichloro-10,11-Dihydro-Dibenzo [b,f] [1,4] Thiazepine*

Following the procedure of Example 1, but substituting 120 g. of p-chlorobenzenethiol for the benzenethiol in step (a), yields 2,8-dichloro-10,11-dihydro-dibenzo [b,f] [1,4] thiazepine.

Similarly, if other substituted 2-chloronitrobenzenes and/or benzenethiols are substituted for the 2,5-dichloronitrobenzene and benzenethiol, respectively, in Example 1, step (a), and the remaining steps of the example are carried out, correspondingly substituted 10,11-dihydro-dibenzo [b,f] [1,4] thiazepines are prepared. Thus, 5-methyl-2-chloronitrobenzene and 5'-methoxy-2-chloronitrobenzene yield 8-methyl-10,11-dihydro-dibenzo [b,f] [1,4] thiazepine and 8-methoxy-10,11-dihydro-dibenzo [b,f] [1,4] thiazepine, respectively; whereas, p-toluenethiol, p-methoxybenzenethiol, and p-trifluoromethylbenzenethiol give 2-methyl-10,11-dihydro-dibenzo [b,f] [1,4] thiazepine, 2-methoxy-10,11-dihydro-dibenzo [b,f] [1,4] thiazepine, and 2-trifluoromethyl-10,11-dihydro-dibenzo [b,f] [1,4] thiazepine, respectively.

EXAMPLE 5

*10,11-Dihydro-11-Phenyldibenzo [b,f] [1,4] Thiazepine*

(a) *Preparation of 2-(phenylthio)benzanilide.*—To 4.8 g. of sodium hydroxide in 50 ml. of water at 0° is added 9.0 g. of o-(phenylthio)aniline, 25 ml. of benzene and finally 5.9 g. of benzoyl chloride. The mixture is shaken about one hour, the benzene solution is separated, dried and concentrated to give 9 g. of crude 2-(phenylthio)-benzanilide, M.P. about 59–60°. Recrystallization from 95% ethanol gives the pure product, M.P. about 69–70°.

(b) *Preparation of 11-phenyldibenzo [b,f] [1,4] thiazepine.*—Following the procedure of Example 1, step (d), but substituting 40 g. of 2-(phenylthio)benzanilide for 5-chloro-2-(phenylthio) formanilide, gives 11-phenyldibenzo [b,f] [1,4] thiazepine, M.P. about 110–111°.

(c) *Preparation of 10,11 - dihydro - 11 - phenydibenzo [b,f] [1,4] thiazepine.*—A solution prepared from 9.3 g. of anhydrous aluminum chloride and 150 ml. of anhydrous ether is added dropwise to a stirred slurry of 2.66 g. of lithium aluminum hydride in 100 ml. of anhydrous ether and the mixture stirred an additional five minutes. To this mixture is added a solution of 10 g. of 11-phenyldibenzo [b,f] [1,4] thiazepine in 200 ml. of anhydrous ether. The reaction mixture is then stirred for one hour at room temperature and subsequently for a further hour at reflux temperature. The excess reducing agent is then destroyed by the consecutive dropwise addition of 5 ml. of water and 15 ml. of 20% sodium hydroxide solution to the ice cooled reaction mixture. The ether solution is then filtered and dried. After distillation of the ether the oily residue is crystallized by trituration in methanol to give about 9 g. of product, M.P. about 105–106°.

*Analysis.*—Calcd. for $C_{19}H_{15}NS$: C, 78.85; H, 5.22; N, 4.84. Found: C, 78.28; H, 5.04; N, 4.97.

EXAMPLE 6

*10,11-Dihydro-11-Methyldibenzo [b,f] [1,4] Thiazepine*

Following the procedure of Example 5, but substituting 3.3 g. of acetyl chloride for the benzoyl chloride in step (a), 10,11-dihydro-11-methyldibenzo [b,f] [1,4] thiazepine is obtained.

EXAMPLE 7

*10,11-Dihydro-8-Chloro-11-Phenyldibenzo [b,f] [1,4] Thiazepine*

Following the procedure of Example 5, but substituting 9.5 g. of 5-chloro-2-(phenylthio)aniline hydrochloride for the o-(phenylthio)aniline hydrochloride in step (a), 10,11-dihydro-8-chloro-11-phenyldibenzo [b,f] [1,4] thiazepine is obtained.

EXAMPLE 8

*10,11-Dihydro-8-(Trifluoromethyl)-11-Phenyldibenzo [b,f] [1,4] Thiazepine*

Following the procedure of Example 5, but substituting 10 g. of 5-trifluoromethyl-2-(phenylthio)aniline hydrochloride for the o-(phenylthio)aniline hydrochloride in step (a), 10,11-dihydro-8-(trifluoromethyl)-11-phenyldibenzo [b,f] [1,4] thiazepine is obtained.

EXAMPLE 9

*8-Chloro-10,11-Dihydrodibenzo [b,f] [1,4] Thiazepine-10-Carbonyl Chloride*

To a stirred solution of 20.0 g. of 8-chloro 10,11-dihydro-dibenzo [b,f] [1,4] thiazepine in 150 ml. of dry toluene cooled to −10° is added 170 ml. of a 9.3% toluene solution of phosgene, also cooled to −10° and, immediately following, 7.1 g. of pyridine. A red solid rapidly precipitates on the addition of the pyridine and slowly redissolves to be followed by the separation of a white solid consisting of pyridine hydrochloride. The reaction mixture is then stirred for three hours and allowed to stand overnight. After filtration, the orange colored solution is washed with water, dried over anhydrous magnesium sulfate and concentrated to dryness to give about 16.3 g. of product. Two recrystallizations from Skellysolve V gives material which melts at about 114–115°.

*Analysis.*—Calcd. for $C_{14}H_{19}Cl_2NOS$: Cl, 22.86; N, 4.51. Found: Cl, 21.92; N, 4.65.

EXAMPLE 10

*8-(Trifluoromethyl)-10,11-Dihydrodibenzo [b,f] [1,4] Thiazepine-10-Carbonyl Chloride*

Starting with 14.1 g. of 8-(trifluoromethyl)-10,11-dihydrodibenzo [b,f] [1,4] thiazepine, 118 ml. of a 16.7% toluene solution of phosgene, 7.9 g. of pyridine and 150 ml. of toluene and following the procedure of Example 9, about 15 g. of 8-(trifluoromethyl)-10,11-dihydrodibenzo [b,f] [1,4] thiazepine-10-carbonyl chloride, M.P. about 94–96°, is obtained.

*Analysis.*—Calcd. for $C_{15}H_{19}ClF_3NOS$: Cl, 10.32. Found: Cl, 10.62.

EXAMPLE 11

*10,11-Dihydrodibenzo [b,f] [1,4] Thiazepine-10-Carbonyl Chloride*

Starting with 21.3 g. of 10,11-dihydrodibenzo [b,f] [1,4] thiazepine in a toluene solution, 150 ml. of a 16.7% toluene solution of phosgene, and 12.0 g. of pyridine and following the procedure of Example 9, there is obtained about 23.7 g. of 10,11-dihydrodibenzo [b,f] [1,4] thiazepine-10-carbonyl chloride, which melts at about 114–115° after recrystallization from Skellysolve V.

*Analysis.*—Calcd. for $C_{14}H_{10}ClNOS$: C, 60.97; H, 3.66. Found: C, 61.33; H, 3.91.

EXAMPLE 12

*2,8-Dichloro-10,11-Dihydrodibenzo [b,f] [1,4] Thiazepine-10-Carbonyl Chloride*

Following the procedure of Example 9, but substituting 22.4 g. of 2,8-dichloro-10,11-dihydrodibenzo [b,f] [1,4] thiazepine for the 8-chloro-10,11-dihydrodibenzo [b,f] [1,4] thiazepine, 2,8-dichloro-10,11-dihydrodibenzo [b,f] [1,4] thiazepine-10-carbonyl chloride is obtained.

Similarly, if other dihydrodibenzothiazepines are substituted for the 8-chloro-dihydrodibenzothiazepine in Example 9, correspondingly substituted 10,11-dihydrodibenzo [b,f] [1,4] thiazepines are prepared. Thus, 8-methyl-10,11-dihydrodibenzo [b,f] [1,4] thiazepine and 8-methoxy-10,11-dihydrodibenzo [b,f] [1,4] thiazepine yield 8-methyl-10,11-dihydrodibenzo [b,f] [1,4] thiazepine-10-carbonyl chloride and 8-methoxy-10,11-dihydrodibenzo [b,f] [1,4] thiazepine-10-carbonyl chloride, respectively.

EXAMPLE 13

*10,11-Dihydro-11-Phenyldibenzo [b,f] [1,4] Thiazepine-10-Carbonyl Chloride*

Following the procedure of Example 9, but substituting 23.2 g. of 10,11-dihydro-11-phenyldibenzo [b,f] [1,4] thiazepine for the 8-chloro-10,11-dihydrodibenzo [b,f] [1,4] thiazepine, 10,11-dihydro-11-phenyldibenzo [b,f] [1,4] thiazepine-10-carbonyl chloride is obtained.

EXAMPLE 14

*10,11-Dihydro-11-Methyldibenzo [b,f] [1,4] Thiazepine-10-Carbonyl Chloride*

Following the procedure of Example 9, but substituting 18.1 g. of 10,11-dihydro-11-methyldibenzo [b,f] [1,4] thiazepine for the 8-chloro-10,11-dihydrodibenzo [b,f] [1,4] thiazepine, 10,11-dihydro-11-methyldibenzo [b,f] [1,4] thiazepine-10-carbonyl chloride is obtained.

EXAMPLE 15

*10,11-Dihydro-8-Chloro-11-Phenyldibenzo [b,f] [1,4] Thiazepine-10-Carbonyl Chloride*

Following the procedure of Example 9, but substituting 23.2 g. of 10,11-dihydro-8-chloro-11-phenyldibenzo [b,f] [1,4] thiazepine for the 8-chloro-10,11-dihydrodibenzo [b,f] [1,4] thiazepine, 10,11-dihydro-8-chloro-11-phenyldibenzo [b,f] [1,4] thiazepine-10-carbonyl chloride is obtained.

EXAMPLE 16

*10,11-Dihydro-8-(Trifluoromethyl)-11-Phenyldibenzo [b,f] [1,4] Thiazepine-10-Carbonyl Chloride*

Following the procedure of Example 9, but substituting 25.7 g. of 10,11-dihydro-8-(trifluoromethyl)-11-phenyldibenzo [b,f] [1,4] thiazepine for the 8-chloro-10,11-dihydrodibenzo [b,f] [1,4] thiazepine, 10,11-dihydro-8-(trifluoromethyl)-11-phenyldibenzo [b,f] [1,4] thiazepine-10-carbonyl chloride is obtained.

EXAMPLE 17

*8-Chloro-10,11-Dihydrodibenzo [b,f] [1,4] Thiazepine-10-Carboxylic Acid, Ester With 2-Dimethylaminoethanol*

A mixture of 5.0 g. of 8-chloro-10,11-dihydrodibenzo [b,f] [1,4] thiazepine-10-carbonyl chloride, 14.3 g. of dimethylaminoethanol and 150 ml. of dry toluene is refluxed for five hours. The supernatant is then decanted from the gummy material which forms during the reaction, washed with water and dried over anhydrous magnesium sulfate. Distillation of the solvent in vacuo gives a residue from which 2.2 g. of product is obtained after four recrystallizations from ligroin, M.P. about 86–87°.

*Analysis.*—Calcd. for $C_{18}H_{19}ClN_2O_2S$: C, 59.57; H, 5.28; N, 7.72. Found: C, 60.06; H, 5.37; N, 7.47.

EXAMPLE 18

*10,11-Dihydro-8-(Trifluoromethyl)Dibenzo [b,f] [1,4] Thiazepine-10-Carboxylic Acid, Ester With 2-Dimethylaminoethanol*

Using the procedure of Example 17 and employing 52 g. of 10,11-dihydro-8-(trifluoromethyl)dibenzo [b,f] [1,4] thiazepine-10-carbonyl chloride and 13.4 g. of 2- dimethylaminoethanol in 125 ml. of toluene as the reactants, about 2.6 g. of 10,11-dihydro-8-(trifluoromethyl) dibenzo [b,f] [1,4] thiazepine-10-carboxylic acid, ester with 2-dimethylaminoethanol, M.P. about 76.5–77.5°, is obtained.

*Analysis.*—Calcd. for $C_{19}H_{19}F_3N_2O_2S$: C, 57.56; H, 4.83; N, 7.07. Found: C, 57.32; H, 4.72; N, 7.07.

EXAMPLE 19

*10,11-Dihydrodibenzo [b,f] [1,4] Thiazepine-10-Carboxylic Acid, Ester With 2-Dimethylaminoethanol, Salt With One Mole of Maleic Acid*

(a) *Preparation of 10,11-dihydrodibenzo [b,f] [1,4] thiazepine-10-carboxylic acid, ester with 2-dimethylaminoethanol.*—Following the procedure of Example 17, about 11.3 g. of 10,11-dihydrodibenzo [b,f] [1,4] thiazepine-10-carboxylic acid, ester with 2-dimethylaminoethanol, is obtained from the reaction of 11.0 g. of 10,11-dihydrodibenzo [b,f] [1,4] thiazepine-10-carbonyl chloride with 18.0 g. of 2-dimethylaminoethyl alcohol in the presence of 2.4 g. of a 50% dispersion of sodium hydride in mineral oil.

*Analysis.*—Calcd. for $C_{18}H_{20}N_2O_2S$: C, 65.84; H, 6.14. Found: C, 66.01; H, 5.95.

(b) *Preparation of the maleic acid salt.*—To a cooled, stirred solution of 11.3 g. of 10,11-dihydrodibenzo [b,f] [1,4] thiazepine-10-carboxylic acid, ester with 2-dimethylaminoethanol in 100 ml. of anhydrous ether is added in small portions a solution of 5.0 g. of maleic acid in 40 ml. of acetone. The solid which forms is filtered, dried and recrystallized from a mixture of acetonitrile and anhydrous ether, to yield about 10.3 g. of product, M.P. about 108–110° C.

*Analysis.*—Calcd. for $C_{18}H_{20}N_2O_2S \cdot C_4H_4O_4$: C, 59.45; H, 5.44; N, 6.30. Found: C, 59.49; H, 5.60; N, 6.27.

EXAMPLE 20

*8-Chloro-10,11-Dihydrodibenzo [b,f] [1,4] Thiazepine-10-Carboxylic Acid, Ester With 2-(2-Piperidinoethoxy) Ethanol, Salt With One Mole of Oxalic Acid*

(a) *Preparation of 8-chloro-10,11-dihydrodibenzo [b,f] [1,4] thiazepine-10-carboxylic acid, ester with 2-(2-piperidinoethoxy)-ethanol.*—A mixture of 10.3 g. of 8-chloro-10,11-dihydrodibenzo [b,f] [1,4] thiazepine-10-carbonyl chloride, 17.3 g. of 2-(2-piperidinoethoxy)ethanol (prepared from $HOCH_2CH_2OCH_2CH_2Cl$ and piperidine) and 150 ml. of dry toluene is heated under reflux for seven hours. The cooled reaction mixture is then extracted with 200 ml. of 5% hydrochloric acid, the extract made alkaline with an excess of solid potassium carbonate, and the liberated base extracted with ether. After drying, the extract is freed of ether and the residue heated approximately at 110–130° (0.5 mm.) to remove the excess 2-(2-piperidinoethoxy)ethanol. The yield of ester is about 7.8 g.

(b) *Preparation of the oxalic acid salt.*—To a solution of the base obtained in step a in 100 ml. of anhydrous ether is added a warm solution of 1.6 g. of oxalic acid in 10 ml. of acetone. The resulting gum crystallizes after standing in fresh ether for several days. This material is recrystallized two times from methyl ethyl ketone to give about 3.7 g. of product, M.P. about 99–100°.

*Analysis.*—Calcd. for $C_{23}H_{27}ClN_2O_3S \cdot C_2H_2O_4$: C, 55.91; H, 5.44; N, 5.22. Found: C, 55.85; H, 5.70; N, 4.98.

EXAMPLE 21

*8-(Trifluoromethyl)-10,11-Dihydrodibenzo [b,f] [1,4] Thiazepine-10-Carboxylic Acid, Ester With 2-(2-Piperidinoethoxy)Ethanol, Salt With One Mole of Oxalic Acid*

(a) *Preparation of 8-(trifluoromethyl)-10,11-dihydrodibenzo [b,f] [1,4] thiazepine-10-carboxylic acid, ester with 2-(2-piperidinoethoxy)ethanol.*—Following the procedure of Example 20, step a, there is obtained from the reaction of 10.0 g. of 10,11-dihydro-8-(trifluoromethyl) dibenzo [b,f] [1,4] thiazepine-10-carbonyl chloride with 25.2 g. of 2-(2-piperidinoethoxy)ethanol, about 13.0 g. of the product as a dark viscous oil.

*Analysis.*—Calcd. for $C_{24}H_{27}F_3N_2O_3S$: C, 59.98; H, 5.66. Found: C, 59.93; H, 6.93.

(b) *Preparation of the oxalic acid salt.*—To an ice-cooled, stirred solution of 12.7 g. of 8-(trifluoromethyl)-10,11-dihydrodibenzo [b,f] [1,4] thiazepine - 10 - carboxylic acid, ester with 2-(2-piperidinoethoxy)ethanol, is slowly added a solution of 2.4 g. of oxalic acid in 25 ml. of acetone. The oxalate separates as a viscous gum and after standing for several days becomes a semi-solid. Extraction of this material with boiling methyl amyl ketone and subsequent cooling of the extract gives the product. One recrystallization from benzene raises the M.P. from about 90–92° to about 104–106° (dried in vacuo at 55°), yield about 0.85 g.

*Analysis.*—Calcd. for $C_{24}H_{27}F_3N_2O_3S \cdot C_2H_2O_4$: C, 54.72; H, 5.13; N, 4.92. Found: C, 55.02; H, 5.20; N, 4.93.

EXAMPLE 22

*10,11-Dihydrodibenzo [b,f] [1,4] Thiazepine-10-Carboxylic Acid, Ester With 2-(2-Piperidinoethoxy)Ethanol, Salt With One Mole of Oxalic Acid*

(a) *Preparation of 10,11-dihydrodibenzo [b,f] [1,4] thiazepine-10-carboxylic acid, ester with 2-(2-piperidinoethoxy)ethanol.*—Following the procedure of Example 20, step (a) the reaction of 11.0 g. of 10,11-dihydrodibenzo [b,f] [1,4] thiazepine-10-carbonyl chloride with 10.4 g. of 2-(2-piperidinoethoxy)ethanol in the presence of 2.9 g. of a 50% dispersion of sodium hydride in mineral oil gives about 16.0 g. of product as an amber colored oil.

(b) *Preparation of the oxalic acid salt.*—To a stirred solution of 16.0 g. of 10,11-dihydrodibenzo [b,f] [1,4] thiazepine-10-carboxylic acid, ester with 2-(2-piperidinoethoxy)ethanol in 50 ml. of anhydrous ether is gradually added a solution of 5.4 g. of oxalic acid in 50 ml. of dry acetone. The resulting precipitate is filtered, dried and recrystallized from absolute ethyl alcohol to give about 11.3 g. of product, M.P. about 141–142°.

*Analysis.*—Calcd. for $C_{23}H_{28}N_2O_3S \cdot C_2H_2O_4$: C, 59.74; H, 6.01; N, 5.57. Found: C, 59.51; H, 6.12; N, 5.32.

EXAMPLE 23

*2,8-Dichloro-10,11-Dihydrodibenzo [b,f] [1,4] Thiazepine-10-Carboxylic Acid, Ester With 2-Dimethylaminoethanol*

Following the procedure of Example 17, but substituting 5.2 g. of 2,8-dichloro-10,11-dihydrodibenzo [b,f] [1,4] thiazepine-10-carbonyl chloride for the 8-chloro-10,11-dihydrodibenzo [b,f] [1,4] thiazepine-10-carbonyl chloride, 2,8-dichloro-10,11-dihydrodibenzo [b,f] [1,4] thiazepine-10-carboxylic acid, ester with 2-dimethylaminoethanol is obtained.

Similarly, if other dihydrodibenzothiazepine-10-carbonyl chlorides are substituted for the 8-chlorodihydrodibenzothiazepine-10-carbonyl chloride in Example 17, correspondingly substituted 10,11-dihydrodibenzo [b,f] [1,4] thiazepine-10-carboxylic acid, esters with 2-dimethylaminoethanol are prepared. Thus, 8-methyl-10,11-dihydrodibenzo [b,f] [1,4] thiazepine-10-carbonyl chloride and 8-methoxy-10,11-dihydrodibenzo [b,f] [1,4] thiazepine-10-carbonyl chloride yield 8-methyl-10,11-dihydrodibenzo [b,f] [1,4] thiazepine-10-carboxylic acid, ester with 2-dimethylaminoethanol, and 8-methoxy-10,11-dihydrodibenzo [b,f] [1,4] thiazepine-10-carboxylic acid, ester with 2-dimethylaminoethanol, respectively.

EXAMPLE 24

*10,11-Dihydro-11-Phenyldibenzo [b,f] [1,4] Thiazepine-10-Carboxylic Acid, Ester With 2-Dimethylaminoethanol*

Following the procedure of Example 17, but substituting 5.8 g. of 10,11-dihydro-11-phenyldibenzo [b,f] [1,4] thiazepine-10-carbonyl chloride for the 8-chloro-10,11-dihydrodibenzo [b,f] [1,4] thiazepine - 10 - carbonyl chloride, 10,11-dihydro-11-phenyldibenzo [b,f] [1,4] thiazepine-10-carboxylic acid, ester with 2-dimethylaminoethanol, is obtained.

EXAMPLE 25

*10,11-Dihydro-11-Methyldibenzo [b,f] [1,4] Thiazepine-10-Carboxylic Acid, Ester With 2-Diethylaminoethanol*

Following the procedure of Example 17, but substituting 4.6 g. of 10,11-dihydro-11-methyldibenzo [b,f] [1,4] thiazepine-10-carbonyl chloride for the 8-chloro-10,11-dihydrodibenzo [b,f] [1,4] thiazepine - 10 - carbonyl chloride and 18.8 g. of 2-diethylaminoethanol for the dimethylaminoethanol, 10,11 - dihydro - 11 - methyldibenzo [b,f] [1,4] thiazepine-10-carboxylic acid, ester with 2-diethylaminoethanol, is obtained.

EXAMPLE 26

*10,11-Dihydro-8-Chloro-11-Phenyldibenzo [b,f] [1,4] Thiazepine-10-Carboxylic Acid, Ester With 2-Dimethylaminoethanol*

Following the procedure of Example 17, but substituting 5.7 g. of 10,11-dihydro-8-chloro-11-phenyldibenzo [b,f] [1,4] thiazepine-10-carbonyl chloride for the 8-chloro-10,11-dihydrodibenzo [b,f] [1,4] thiazepine-10-carbonyl chloride, 10,11-dihydro-8-chloro-11-phenyldibenzo [b,f] [1,4] thiazepine-10-carboxylic acid, ester with 2-dimethylaminoethanol, is obtained.

EXAMPLE 27

*10,11 - Dihydro-8 - (Trifluoromethyl) - 11-Phenyldibenzo [b,f] [1,4] Thiazepine-10-Carboxylic Acid, Ester With 2-Dimethylaminoethanol*

Following the procedure of Example 17, but substituting 6.1 g. of 10,11-dihydro-8-(trifluoromethyl)-11-phenyldibenzo [b,f] [1,4] thiazepine-10-carbonyl chloride for the 8-cloro-10-11-dihydrodibenzo [b,f] [1,4] thiazepine-10-carbonyl chloride, 10,11-dihydro-8-(trifluoromethyl)-11-phenyldibenzo [b,f] [1,4] thiazepine-10-carboxylic acid, ester with 2-dimethylaminoethanol, is obtained.

EXAMPLE 28

*8-Chloro-10,11-Dihydrodibenzo [b,f] [1,4] Thiazepine-10-Carboxylic Acid, Ester With 3-(N⁴-Methylpiperazino)Propanol, Hydrochloride*

Following the procedure of Example 20, but substituting 19.8 g. of 3-(N⁴-methylpiperazino)propanol (prepared from N-methylpiperazine and

HOCH₂CH₂OCH₂CH₂Cl)

for the 2-(2-piperidinoethoxy)ethanol in step a and 1.1 g. of hydrogen chloride for the oxalic acid in step b, 8-chloro-10,11-dihydrodibenzo [b,f] [1,4] thiazepine-10-carboxylic acid, ester with 3-(N⁴-methylpiperazino)propanol, hydrochloride, is obtained.

Similarly, by substituting an equivalent amount of 3-[N⁴-(2-hydroxyethyl)piperazino]propanol, 3-[N⁴(2-acetoxyethyl)-piperazino]propanol or 3[N⁴-(2-hydroxyethoxyethyl)piperazino]-propanol for the 2-(2-piperidinoethoxy)ethanol in step a of Example 20 and an equivalent amount of hydrochloric acid for the oxalic acid in step b of Example 20, and following the procedure of the example, the hydrochloride salts of 8-chloro-10,11-dihydrodibenzo [b,f] [1,4] thiazepine-10-carboxylic acid esters with 3-[N⁴-(2-hydroxyethyl)piperazino]propanol, 3[N⁴-(2-acetoxyethyl) piperazino]propanol, and 3-[N⁴-(2-hydroxyethoxyethyl)piperazino]propanol are obtained, respectively.

EXAMPLE 29

*8-Chloro-10,11-Dihydrodibenzo [b,f] [1,4]Thiazepine-10-Carboxylic Acid, Amide With 2-Dimethylaminoethylamine*

A mixture of 10.3 g. of 8-chloro-10,11-dihydrodibenzo [b,f] [1,4] thiazepine-10-carbonyl chloride, 8.9 g. of 2-dimethylaminoethyl amine and 150 ml. of dry toluene is heated under reflux for five hours and worked up as in Example 17 to give 8-chloro-10,11-dihydrodibenzo [b,f] [1,4] thiazepine-10-carboxylic acid, amide with 2-dimethylaminoethylamine.

EXAMPLE 30

*10,11-Dihydro-8-(Trifluoromethyl)Dibenzo [b,f] [1,4] Thiazepine-10-Carboxylic Acid, Amide With 2-Dimethylaminoethylamine*

Following the procedure of Example 29, but substituting 11.5 g. of 10,11-dihydro-8-(trifluoromethyl)dibenzo [b,f] [1,4] thiazepine-10-carbonyl chloride for the 8-chloro-10,11-dihydrobenzo [b,f] [1,4] thiazepine-10-carbonyl chloride, 10,11-dihydro-8-(trifluoromethyl)dibenzo [b,f] [1,4] thiazepine-10-carboxylic acid, amide with 2-dimethylaminoethylamine, is obtained.

EXAMPLE 31

*10,11-Dihydrodibenzo [b,f] [1,4] Thiazepine-10-Carboxylic Acid, Amide With 2-Dimethylaminoethylamine*

Following the procedure of Example 29, but substituting 9.2 g. of 10,11-dihydrodibenzo [b,f] [1,4] thiazepine-10-carbonyl chloride for the 8-chloro-10,11-dihydrodibenzo [b,f] [1,4] thiazepine-10-carbonyl chloride, 10,11-dihydrodibenzo [b,f] [1,4] thiazepine-10-carboxylic acid, amide with 2-dimethylaminoethylamine, is obtained.

EXAMPLE 32

*8-Chloro-10,11-Dihydrodibenzo [b,f] [1,4] Thiazepine-10-Carboxylic Acid, Amide With 2-(2-Piperidinoethoxy)Ethylamine, Salt With One Mole of Oxalic Acid*

(a) *Preparation of 8-chloro-10,11-dihydrodibenzo [b,f] [1,4] thiazepine-10-carboxylic acid, amide with 2-(2-piperidinoethoxy)-ethylamine.*—Following the procedure of Example 29, but substituting 11.6 g. 2-(2-piperidinoethoxy)ethylamine (prepared from piperidinoethanol and 2-chloroethylamine) for the 2-dimethylaminoethylamine, 8-chloro-10,11-dihydrodibenzo [b,f] [1,4] thiazepine-10-carboxylic acid, amide with 2-(2-piperidinoethoxy) ethylamine, is obtained.

(b) *Preparation of the oxalic acid salt.*—To a solution of 4.46 g. of 8-chloro-10,11-dihydrodibenzo [b,f] [1,4] thiazepine-10-carboxylic acid, amide with 2-(2-piperidinoethoxy)ethylamine in 100 ml. of anhydrous ether is added a warm solution of 0.9 g. of oxalic acid in 10 ml. of acetone. The resulting precipitate is crystallized twice from acetonitrile to give the product.

EXAMPLE 33

*2,3-Dichloro-10,11-Dihydrodibenzo [b,f] [1,4] Thiazepine-10-Carboxylic Acid, Amide With 2-Dimethylaminoethylamine*

Following the procedure of Example 29, but substituting 11.5 g. of 2,8-dichloro-10,11-dihydrodibenzo [b,f] [1,4] thiazepine-10-carbonyl chloride for the 8-chloro-10,11-dihydrodibenzo [b,f] [1,4] thiazepine-10-carbonyl chloride, 2,8-dichloro-10,11-dihydrodibenzo [b,f] [1,4] thiazepine-10-carboxylic acid, amide with 2-dimethylaminoethylamine, is obtained.

Similarly, if other dihydrodibenzothiazepine-10-carbonyl chlorides are substituted for the 8-chlorodihydrodibenzothiazepine-10-carbonyl chloride in Example 29, correspondingly substituted 10,11-dihydrodibenzo [b,f] [1,4] thiazepine-10-carboxylic acid, amides with 2-dimethylaminoethylamine are prepared. Thus, 8-methyl-10,11-dihydrodibenzo [b,f] [1,4] thiazepine-10-carbonyl chloride and 8-methoxy-10,11-dihydrodibenzo [b,f] [1,4] thiazepine-10-carbonyl chloride yield 8-methyl-10,11-dihydrodibenzo [b,f] [1,4] thiazepine-10-carboxylic acid, amide with 2-dimethylaminoethylamine, and 8-methoxy-10,11-dihydrodibenzo [b,f] [1,4] thiazepine-10-carboxylic acid, amide with 2-dimethylaminoethylamine, respectively.

EXAMPLE 34

*10,11-Dihydro-11-Phenyldibenzo [b,f] [1,4] Thiazepine-10-Carboxylic Acid, Amide With 2-Dimethylaminoethylamine*

Following the procedure of Example 29, but substituting 11.7 g. of 10,11-dihydro-11-phenyldibenzo [b,f] [1,4] thiazepine-10-carbonyl chloride for the 8-chloro-10,11-dihydrodibenzo [b,f] [1,4] thiazepine-10-carbonyl chloride, 10,11-dihydro-11-phenyldibenzo [b,f] [1,4] thiazepine-10-carboxylic acid, amide with 2-dimethylaminoethylamine, is obtained.

EXAMPLE 35

*10,11-Dihydro-11-Methyldibenzo [b,f] [1,4] Thiazepine-10-Carboxylic Acid, Amide With 2-Diethylaminoethylamine*

Following the procedure of Example 29, but substituting 9.7 g. of 10,11-dihydro-11-methyldibenzo [b,f] [1,4] thiazepine-10-carbonyl chloride for the 8-chloro-10,11-dihydrodibenzo [b,f] [1,4] thiazepine-10-carbonyl chloride and 7.8 g. of 2-diethylaminoethylamine for the dimethylaminoethylamine, 10,11-dihydro-11-methyldibenzo [b,f] [1,4] thiazepine-10-carboxylic acid, amide with 2-diethylaminoethylamine, is obtained.

EXAMPLE 36

*10,11-Dihydro-8-Chloro-11-Phenyldibenzo [b,f] [1,4] Thiazepine-10-Carboxylic Acid, Amide With 2-Dimethylaminoethylamine*

Following the procedure of Example 29, but substituting 13.0 g. of 10,11-dihydro-8-chloro-11-phenyldibenzo [b,f] [1,4] thiazepine-10-carbonyl chloride for the 8-chloro-10,11-dihydrodibenzo [b,f] [1,4] thiazepine-10-carbonyl chloride, 10,11-dihydro-8-chloro-11-phenyldibenzo [b,f] [1,4] thiazepine-10-carboxylic acid, amide with 2-dimethylaminoethylamine, is obtained.

EXAMPLE 37

*10,11-Dihydro-8-(Trifluoromethyl) - 11 - Phenyldibenzo [b,f] [1,4] Thiazepine-10-Carboxylic Acid, Amide With 2-Dimethylaminoethylamine*

Following the procedure of Example 29, but substituting 14.1 g. of 10,11-dihydro-8-(trifluoromethyl)-11-phenyldibenzo [b,f] [1,4] thiazepine-10-carbonyl chloride for the 8-chloro-10,11-dihydrodibenzo [b,f] [1,4] thiazepine-10-carbonyl chloride, 10,11 - dihydro-8-(trifluoromethyl)-11-phenyldibenzo [b,f] [1,4] thiazepine-10-carboxylic acid, amide with 2-dimethylaminoethylamine is obtained.

EXAMPLE 38

*8-Chloro-10,11-Dihydrodibenzo [b,f] [1,4] Thiazepine-10-Carboxylic Acid, Amide With 3-($N^4$-Methylpiperazino)Propylamine, Hydrochloride*

Following the procedure of Example 32, but substituting 10.5 g. of 3-($N^4$-methylpiperazino)propylamine (prepared by reaction of phthalimidopropyl chloride with N-methylpiperazine, followed by hydrolysis) for the 2-(2-piperidinoethoxy)ethylamine in step *a* and 0.37 g. of hydrogen chloride for the oxalic acid in step (*b*), 8-chloro-10,11-dihydrodibenzo [b,f] [1,4] thiazepine-10-carboxylic acid, amide with 3-($N^4$-methylpiperazino)propylamine, hydrochloride, is obtained.

Similarly, by substituting an equivalent amount of 3-[$N^4$-(2-hydroxyethyl)piperazino]propylamine [prepared from phthalimidopropyl chloride and $N^4$-(2-hydroxyethylpiperazine), followed by hydrolysis] or 3-[$N^4$-(2-hydroxyethoxyethyl)piperazino]propylamine (prepared from phthalimidopropyl chloride and $N^4$-(2-hydroxyethoxyethyl)piperazine followed by hydrolysis) for the 2-(2-piperidinoethoxy)ethylamine in step *a* of Example 32 and an equivalent amount of hydrochloric acid for the oxalic acid in step *b* of Example 32, and following the procedure of the example, the hydrochloride salts of 8-chloro-10,11-dihydrodibenzo [b,f] [1,4] thiazepine-10-carboxylic acid amides with 3-[$N^4$-(2-hydroxyethyl)-piperazino]propylamine and 3-[$N^4$-(2-hydroxyethoxyethyl)piperazino]propylamine are obtained, respectively.

This invention may be variously otherwise embodied within the scope of the appended claims.

What is claimed is:

1. A compound selected from the group consisting of bases of the formula

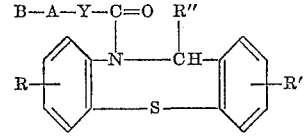

wherein A is selected from the group consisting of lower alkylene and —A'—O—A"—, wherein A' and A" are each lower alkylene and the total number of carbon atoms in A' and A" is less than eight, B is selected from the group consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl)piperidyl, (lower alkoxy)-piperidyl, pyrrolidyl, (lower alkyl)pyrrolidyl, di(lower alkyl)pyrrolidyl, (lower alkoxy)pyrrolidyl, morpholinyl, (lower alkyl)-morpholinyl, di(lower alkyl)morpholinyl, (lower alkoxy)-morpholinyl, thiamorpholinyl, (lower alkyl)thiamorpholinyl, di(lower alkyl)thiamorpholinyl, (lower alkoxy)-thiamorpholinyl, piperazyl, (lower alkyl)piperazyl, di(lower alkyl)piperazyl, (lower alkoxy)-piperazyl, (hydroxy-lower alkyl)piperazyl, (lower alkanoyloxyalkyl)-piperazyl, (hydroxy-lower alkoxy-lower alkyl)piperazyl and (carbo-lower alkoxy)piperazyl of less than twelve carbon atoms, Y is selected from the group consisting of oxy and imino, R and R' are each selected from the group consisting of hydrogen, halogen, lower alkyl, lower alkoxy and trifluoromethyl, R" is selected from the group consisting of hydrogen, lower alkyl and monocyclic hydrocarbon aryl; and non-toxic acid-addition salts thereof.

2. 8 - halo - 10,11 - dihydrodibenzo[b,f][1,4]thiazepine-10-carboxylic acid, ester with di(lower alkyl)amino-(lower alkanol).

3. 8 - (trifluoromethyl) - 10,11 - dihydrodibenzo [b,f]-[1,4]thiazepine-10-carboxylic acid, ester with di(lower alkyl)amino(lower alkanol).

4. 10,11-dihydrodibenzo [b,f] [1,4] thiazepine-10-carboxylic acid, ester with di(lower alkyl)amino(lower alkanol).

5. A non-toxic acid-addition salt of the compound of claim 4.

6. 8-halo-10,11-dihydrodibenzo [b,f] [1,4] thiazepine-10-carboxylic acid, ester with piperadino(lower alkoxy)-(lower alkanol).

7. A non-toxic acid-addition salt of the compound of claim 6.

8. 8-(trifluoromethyl) - 10,11 - dihydrodibenzo [b,f] [1,4] thiazepine-10-carboxylic acid, ester with piperidino (lower alkoxy)(lower alkanol).

9. A compound of the formula

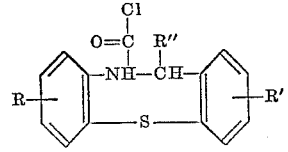

wherein R and R' are each selected from the group consisting of hydrogen, halogen, lower alkyl, lower alkoxy and trifluoromethyl, and R" is selected from the group consisting of hydrogen, lower alkyl and monocyclic hydrocarbon aryl.

10. 8-halo-10,11-dihydrodibenzo [b,f] [1,4] thiazepine-10-carbonyl chloride.

11. 8 - (trifluoromethyl) - 10,11 - dihydrodibenzo [b,f] [1,4] thiazepine-10-carbonyl chloride.

12. 10,11-dihydrodibenzo [b,f] [1,4] thiazepine-10-carbonyl chloride.

References Cited in the file of this patent

FOREIGN PATENTS

| | | |
|---|---|---|
| 208,870 | Austria | May 10, 1960 |
| 537,946 | Belgium | May 31, 1955 |

OTHER REFERENCES

Chemical Abstracts, volume 52, pages 4652–3 (1958), abstracting Hach et al., Chem. Listy, volume 51, pages 1909–14 (1957).